United States Patent
Borgerson et al.

(10) Patent No.: US 7,578,376 B2
(45) Date of Patent: Aug. 25, 2009

(54) LATCHED-PUMP APPLIED CLUTCH

(75) Inventors: James B. Borgerson, Ann Arbor, MI (US); Clinton E. Carey, Monroe, MI (US); James M. Hart, Belleville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 306 days.

(21) Appl. No.: 11/467,001

(22) Filed: Aug. 24, 2006

(65) Prior Publication Data

US 2008/0047800 A1 Feb. 28, 2008

(51) Int. Cl.
*F16D 25/0638* (2006.01)
*F16D 25/12* (2006.01)
(52) U.S. Cl. .................. 192/85 AA; 60/413; 192/85 R
(58) Field of Classification Search ........................ None
See application file for complete search history.

(56) References Cited

U.S. PATENT DOCUMENTS

| | | | |
|---|---|---|---|
| 3,985,063 A * | 10/1976 | Lemon | 91/31 |
| 6,774,595 B1 * | 8/2004 | Laxhuber et al. | 318/565 |
| 7,036,644 B2 | 5/2006 | Stevenson et al. | 192/35 |
| 7,059,579 B2 | 6/2006 | Stevenson | 251/63 |
| 2005/0023102 A1 * | 2/2005 | Brissenden et al. | 192/85 R |

* cited by examiner

*Primary Examiner*—Rodney H Bonck

(57) ABSTRACT

A latched-pump applied clutch circuit is provided for a vehicle transmission having a controllable pump, a controllable pump pressure, and a main sump, the latched-pump applied clutch circuit comprising a clutch, a clutch piston disposed within a cylinder, a plurality of fluid passages, an accumulator, and one or more solenoid valves in fluid communication with the accumulator for building of a backside boost pressure within the accumulator. The backside boost pressure is used to increase, boost, or otherwise assist clutch-apply pressure within the latched-pump applied clutch circuit during transient periods requiring increased torque capacity. The circuit may include an alternative electro-mechanical device for directly applying a controllable backside boost pressure independent of the controllable pump pressure.

8 Claims, 2 Drawing Sheets

| CLUTCH CONDITION | LATCH VALVE (18) | SHIFT VALVE (22) | CLUTCH (23) PRESSURE | BACKSIDE PRESSURE (21) |
|---|---|---|---|---|
| (1) ENGAGING | OPEN | CLOSED | LOW → MED | EXHAUSTED |
| (2) ENGAGED | CLOSED | OPEN | MED → HIGH | LOW → HIGH |
| (3) DISENGAGING | OPEN | OPEN | MED → LOW | LOW |
| (4) DISENGAGED | CLOSED | CLOSED | LOW | EXHAUSTED |

LATCHED-PUMP APPLIED CLUTCH

TECHNICAL FIELD

The present invention relates to a vehicle transmission having a latched-pump applied clutch circuit with an accumulator for providing a backside boost pressure.

BACKGROUND OF THE INVENTION

In a vehicle having an automatic transmission, a clutch assembly smoothly engages a rotating engine crankshaft with a stationary driveshaft for transmission of power to the drive wheels, and also disengages the respective shafts to interrupt power transfer therebetween to permit, for instance, smooth shifting between various gears of a planetary gear set. Clutch assemblies or clutches are torque-transmitting devices typically having a series of friction elements, i.e. a clutch pack, located within a clutch housing and actuated by a clutch piston, the piston being powered or energized by a supply of hydraulic fluid. The hydraulic fluid supply is typically pressurized by a controllable pump. When hydraulic clutch pressure is reduced, the clutch is released or disengaged, and likewise, when clutch pressure is increased, the clutch is actuated or engaged. The hydraulic system may be further controllable to actuate other transmission components, such as a specific clutch or a series of clutches within an automatic transmission.

One such hydraulically-actuated clutch is a latched-pump applied clutch (LPAC). In an automatic transmission containing an LPAC, a controllable pump pressure engages the LPAC while a latching valve closed to thereby trap and substantially seal a supply of pressurized hydraulic fluid within the LPAC circuit. Once adequate clutch-apply pressure has been trapped or sealed within the LPAC circuit, controllable pressure in the main pump circuit may then be reduced as required in order to minimize spin losses elsewhere in the transmission without thereby diminishing available clutch-apply pressure within the LPAC circuit.

A leak or series of leaks within a sealed LPAC circuit may cause a decrease or reduction in available clutch-apply pressure, the effect varying with the severity and/or number of leaks in the circuit. Leakage or bypass might occur at various points within the circuit, including around piston seals, valve body gaskets, various component connections, within latching valves, or through the inherent porosity of cast transmission components. Such leaks, particularly in a relatively stiff of low-compliance system, can deplete available clutch-apply pressure within the LPAC circuit. When applied to a rotating-type clutch in particular, that is a stationary piston is used to clamp or apply a rotating clutch pack, a plurality of thrust bearings are commonly used to allow relative motion without an undue increase in drag. Under these circumstances, however, thrust bearing spin loss may increase along with the increase in clutch-apply pressure.

SUMMARY OF THE INVENTION

Accordingly, an LPAC circuit is provided for use in a vehicle transmission, the LPAC having a clutch with a clutch-apply pressure, at least one valve in fluid communication with a controllable pump, and an accumulator in fluid communication with the clutch and valve for adding compliance or resiliency to the LPAC circuit. The accumulator provides a controllable backside boost pressure to boost or increase the clutch-apply pressure to quickly adjust to transient pressure spikes during periods requiring increased torque capacity.

In one aspect of the invention, the LPAC circuit has a shift-type valve in fluid communication with the controllable pump and the accumulator for admitting a backside boost pressure to the accumulator.

In another aspect of the invention, the LPAC circuit has a no-leak latch-type valve in fluid communication with the controllable pump and the clutch piston for admitting a clutch-apply pressure to the LPAC circuit.

In another aspect of the invention, a controllable electro-mechanical device is operatively connected to the accumulator to independently apply a direct force or boost pressure to actuate a clutch-apply piston disposed within an exhaustible accumulator.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1A, 1B:
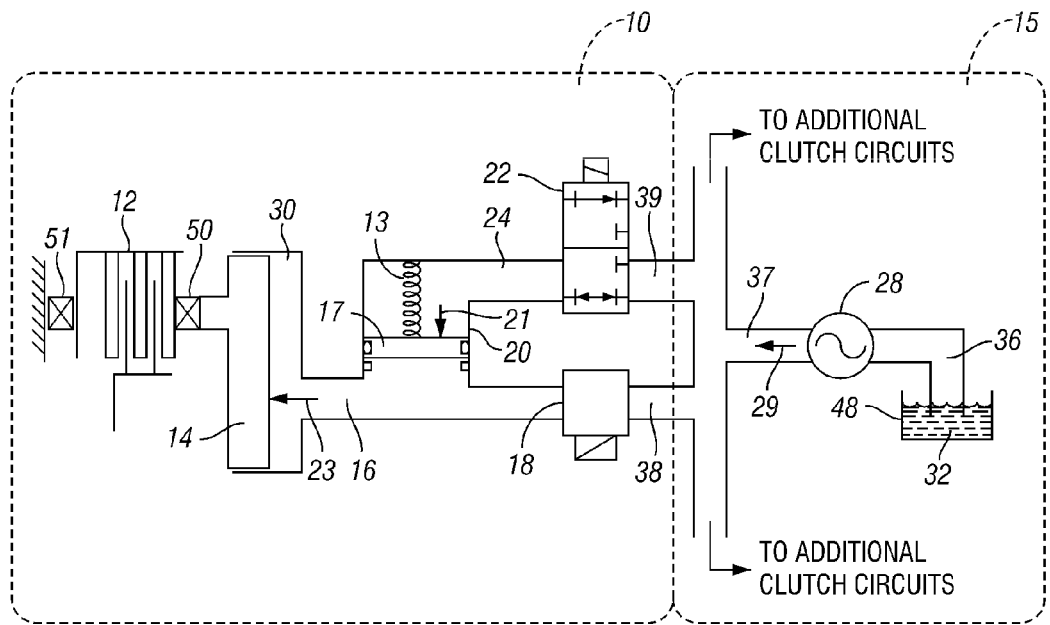
FIG. 1A is a schematic illustration of a hydraulic circuit according to the invention.
FIG. 1B is a table describing the operation of the hydraulic circuit of FIG. 1A.

Referring to the drawings wherein like reference numbers correspond to like or similar components throughout the several figures, there is shown in FIG. 1A a main hydraulic pump circuit 15 in fluid communication with a latched-pump applied clutch (LPAC) circuit 10. Main pump circuit 15 includes a controllable hydraulic pump 28 operatively connected to a main sump 32. Pump 28 is preferably a positive displacement pump, but alternatively may be a fixed displacement pump, variable displacement pump, or other pump suitable for use within an automatic transmission. Main sump 32 contains hydraulic fluid 48, represented in FIG. 1A by dotted lines within sum 32. Fluid 48 is drawn out of sump 32 through a first fluid passage 36, then pressurized by the pump 28 to a controlled pressure, represented by arrow 29, for fluid communication with a second fluid passage 37. Second passage 37 is in fluid communication with a third and fourth fluid passage 38, 39 of LPAC circuit 10, and optionally feeds additional clutch circuits or other components.

The fluid passage 38 is in fluid communication with a first valve 18, preferably a solenoid actuated no-leak latch-type valve operable to admit a fluid 48 having a controlled fluid pressure (arrow 29) from main pump circuit 15 to LPAC circuit 10, then latch or close to thereby capture and seal off the line pressure in the form of pressurized fluid 48 within circuit 10 as required, where the pressure of fluid 48 is then useable to affect clutch apply pressure of the fluid 48, represented by arrow 23. Additionally, fourth fluid passage 39 is in fluid communication with a second valve 22, preferably a solenoid-actuated shift-type valve operable to toggle or shift between two primary states (open/closed), and further configured to selectively exhaust or discharge fluid 48 back to sump 32. Additionally, a fifth fluid passage 24 is in fluid communication with the second valve 22 and with an accumulator 20, the accumulator 20 being disposed between passage 24 and a sixth fluid passage 16.

Accumulator 20 is a pressure storage supply or reservoir for holding fluid 48 under pressure, and is preferably a spring-loaded design in which an accumulator spring 13 is energized by the pressure of fluid 48 to exert a compressive force or backside boost pressure, represented by arrow 21, on an accumulator piston 17 disposed within the volume of the accumulator 20. Accumulator 20 is in fluid communication with a sixth fluid passage 16, the accumulator 20 being further operable to build or accumulate a commandable standby or backside boost pressure (arrow 21) of fluid 48 within the volume of the accumulator 20 in order to rapidly supplement or boost the clutch-apply pressure (arrow 23) when so required, such as during leak-induced pressure loss within LPAC circuit 10. Finally, sixth fluid passage 16 is in fluid communication with a clutch cylinder 30 having an internally-disposed clutch piston 14, wherein the clutch piston 14 is operable to engage a rotating hydraulic clutch 12 when actuated.

Figure 3:
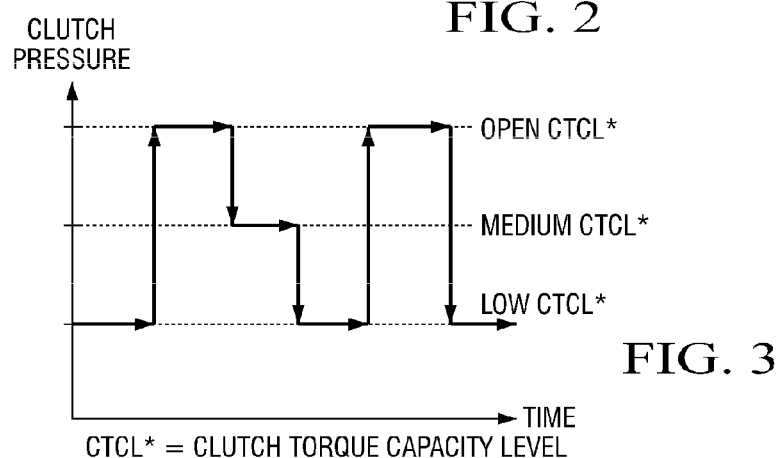
FIG. 3 is a graph showing three discrete latched-pressure levels (TPLs) for a LPAC over a representative duration.

One factor in designing an LPAC circuit as described hereinabove and by FIG. 1A is the trade-off between clutch-apply circuit response time and spin losses through, for example, the thrust bearings 50, 51 disposed on either side of clutch 12 within the LPAC circuit 10. For example, if a clutch-apply pressure (arrow 23) is set at the maximum design capacity of the clutch 12, relatively high spin-losses may result, particularly through the thrust bearings 50, 51 of the LPAC circuit 10. Likewise, if the clutch-apply pressure (arrow 23) is set at a more ideal point short of maximum clutch design capacity, spin losses through the thrust bearings 50, 51 may be thereby minimized, however a transient increase or spike in transmission torque may lead to an increased likelihood of clutch slippage. Therefore, to balance spin loss versus response time during transient periods requiring increased torque capacity, an LPAC circuit will have a plurality of discrete clutch torque capacity levels as depicted in FIG. 3. However, conventional LPAC control strategies can render a given LPAC circuit more sensitive to fluid leaks and/or temperature changes, as noted elsewhere herein.

Figure 4:
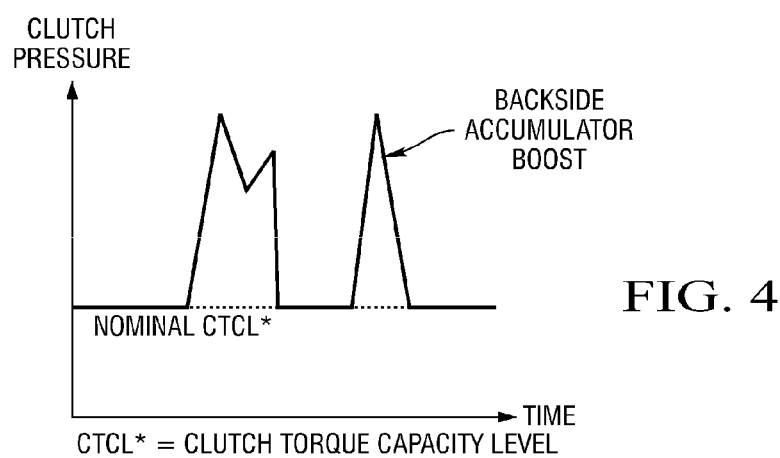
FIG. 4 is a graph showing an LPAC system having a discrete latched-pressure level and a backside accumulator pressure according to the invention.

Turning to FIG. 1B, which shows the various operating conditions available with the embodiment of FIG. 1A in which a 2-state shift-type solenoid valve is used as valve 22, condition 1 shows a clutch 12 in the process of engaging, i.e. clutch engagement has been initiated but has not yet been fully completed, valve 18 opens and valve 22 closes. In this initial state, clutch-apply pressure (arrow 23) of fluid 48 within LPAC circuit 10 builds or increases with the controlled pressure (arrow 29) of main pump circuit 15. Upon entering condition 2, a clutch 12 is fully engaged. Valve 18 is closed to latch or seal clutch-apply pressure (arrow 23) of fluid 48 within clutch-apply cylinder 30. Valve 22 can then be opened, thus allowing accumulator 20 to act as a compliance device. Accumulator 20 also is operatively connected to controlled pressure (arrow 29) of fluid 48 and thus capable of providing a readily available backside boost pressure (arrow 21) of fluid 48 for modulating the torque-capacity of clutch 12, without opening valve 18, particularly in situations requiring rapid and fluctuating increases or spikes in transient torque capacity, as depicted in the graph of FIG. 4.

By using accumulator 20 as herein described, compliance or resiliency is added to LPAC circuit 10 so that, for example, a small leak or leaks within the circuit will have less of a negative impact on available clutch torque capacity or clutch-apply pressure (arrow 23) of fluid 48, thereby helping to preserve LPAC response time and the resulting vehicle drive performance. Clutch piston 14 is preferably a non-rotating piston employing a double-sided fluid seal to minimize the potential for fluid leaks or bypass within clutch cylinder 30. Backside boost pressure (arrow 21) of fluid 48 will be commandable when clutch-apply pressure (arrow 23) of fluid 48 is insufficient to properly engage clutch 12 during transient periods requiring increased torque capacity, e.g. a step-in throttle condition as shown in FIG. 4.

As rotating clutch 12 begins disengaging but is not yet fully disengaged or released, LPAC circuit 10 enters condition 3 in which both of valves 18, 22 are open to controlled pressure (arrow 29) and backside boost pressure (arrow 21) of fluid 48 within accumulator 20 is vented through the valve 22 to sump 32. Clutch 12 thereby reaches the level of controlled pressure (arrow 29) of fluid 48 until fully disengaged, or condition 4 of FIG. 1B. Upon entering the fully disengaged condition, valves 18, 22 are both closed, clutch-apply pressure (arrow 23) of fluid 48 is minimal, and backside pressure (arrow 21) of the fluid 48 in accumulator 2 is fully exhausted. The engagement/disengagement cycle may then repeat as herein described.

Figure 2:
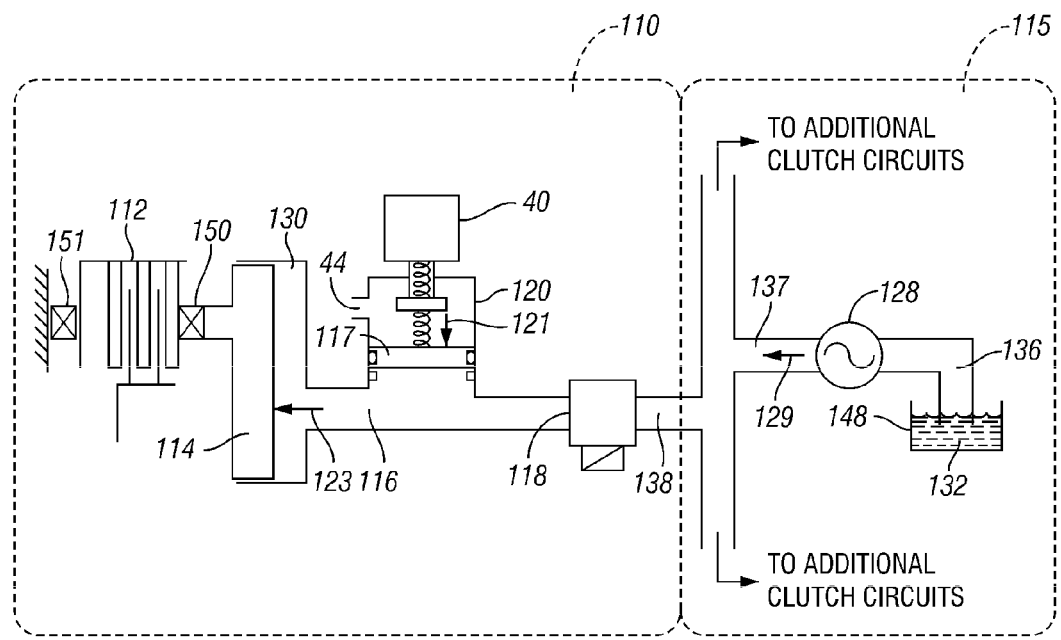
FIG. 2 is a schematic illustration of a hydraulic circuit according to another embodiment of the invention.

In a second embodiment shown in FIG. 2, in which a main hydraulic pump circuit 115 is in fluid communication with a latched-pump applied clutch (LPAC) circuit 110, an electro-mechanical device 40 energizes or pressurizes a hydraulic accumulator 120 within the LPAC circuit 110 by directly applying force to an accumulator piston 117 disposed within the volume of accumulator 120. A controllable pump 128 is in fluid communication via a first passage 136 with a main sump 132 containing hydraulic fluid 148. Pump 128 pressurizes fluid 148 to a controlled pressure, represented by arrow 129, and transmits the fluid 148 through a second fluid pressure 137, through a third fluid passage 138, and to a valve 118, preferably a no-leak latch-type valve operable to admit a controlled pressure (arrow 129) from main pump circuit 115 to LPAC circuit 110. Valve 188 then latches or closes to thereby capture and seal off controlled pressure within circuit 110 as required. The sealed off controlled pressure is then useable as a clutch-apply pressure, represented by arrow 123. Fluid passage 137 may optionally feed additional clutch circuits or other components elsewhere in the transmission as shown.

Valve 118 is in fluid communication with a clutch cylinder 130 through a fourth fluid passage 116, cylinder 130 having a clutch piston 114 disposed therewithin. Piston 114 is operable to engage or actuate a rotating clutch 112 disposed between thrust bearings 150, 151, as shown in FIG. 2. An accumulator 120 is in fluid communication with a fourth fluid passage 116, the accumulator 120 further having an exhaust port 44 configure for continuous venting or exhausting of fluid 148 (and any entrained air) to main sump 132. Accumulator 120 is operatively connected to an electro-mechanical device 40, preferably a motorized ball-screw, for direct application of backside for or pressure, represented by arrow 121, of fluid 148 to accumulator piston 117 when clutch-apply pressure (arrow 123) of fluid 148 is insufficient to actuate or engage clutch 112. In this manner, boost pressure (arrow 121) may increase or boost clutch-apply pressure (arrow 123) when needed.

While the best modes for carrying out the invention have been described in detail, those familiar with the art to which this invention relates will recognize various alternative designs and embodiments for practicing the invention within the scope of the appended claims.

The invention claimed is:

1. A vehicle transmission comprising:
a controllable hydraulic pump operable for generating a line pressure;
a latched-pump applied clutch (LPAC) circuit including:
  a clutch in fluid communication with said hydraulic pump, said clutch including:
    a clutch cylinder having a variable clutch-apply pressure; and
    a clutch-apply piston disposed within said clutch cylinder;
  an accumulator in fluid communication with said hydraulic pump and said clutch-apply piston, said accumulator containing an accumulator piston and being operable for accumulating a boost pressure as a compressive force acting on a first side of said accumulator piston, and for selectively transmitting said boost pressure to said clutch from a second side of said accumulator piston that is opposite said first side to temporarily increase said variable clutch-apply pressure in response to predetermined conditions; and
  a plurality of valves including a first valve in fluid communication with each of said hydraulic pump and said accumulator at said first side of said accumulator piston for selectively admitting said boost pressure into said accumulator, and with said clutch at said second side of said accumulator piston, and a second valve in fluid communication with each of said hydraulic pump and said clutch-apply piston and positioned therebetween for admitting said pressurized fluid into said clutch cylinder to thereby provide at least part of said variable clutch-apply pressure;
wherein the selective transmission of said boost pressure to said clutch-apply piston temporarily increases said variable clutch-apply pressure by boosting said line pressure, and wherein said first valve opens when said clutch is in one of a fully engaged state and a disengaging state, and wherein said second valve opens when said clutch is in one of an engaging state and a disengaging state, both of said first and said second valves otherwise remaining closed.

2. The transmission of claim 1, wherein said first valve is operable for shifting between an open state and a closed state, and is further configured to selectively exhaust said pressurized fluid, and wherein said second valve is configured for selectively latching to thereby capture and seal off said pressurized fluid.

3. The transmission of claim 1, wherein said boost pressure is transmittable to said clutch-apply piston when said variable clutch-apply pressure falls below a predetermined level.

4. The vehicle transmission of claim 1, wherein said predetermined conditions are selected from the group consisting essentially of: a step-in throttle condition and a leak-induced pressure loss within said LPAC circuit.

5. A vehicle transmission comprising:
a controllable hydraulic pump;
a latch-applied clutch (LPAC) circuit in fluid communication with said hydraulic pump and having:
  a clutch cylinder containing a clutch-apply piston, said clutch-apply piston being selectively moveable using a variable clutch-apply pressure;
  an accumulator in fluid communication with said pump and said clutch cylinder, said accumulator having an accumulator piston adapted to transmit a boost pressure to said clutch-apply piston;
  an electro-mechanical device operatively connected to said accumulator and operable to directly apply said boost pressure to said accumulator piston; and
  a valve in fluid communication with said hydraulic pump and said clutch-apply piston for selectively capturing and sealing off a line pressure provided from said hydraulic pump to the LPAC circuit;
wherein said accumulator is adapted to selectively transmit said boost pressure to said clutch-apply piston using said accumulator piston to thereby temporarily boost said variable clutch-apply pressure in response to at least one predetermined condition, wherein said variable clutch-apply pressure is defined by the sum of said boost pressure and said line pressure.

6. The transmission of claim 5 including a main sump, wherein said accumulator is continuously exhaustible to said main sump.

7. The transmission of claim 5, wherein said boost pressure is transmittable from said accumulator to said clutch-apply piston when said clutch-apply pressure falls below a predetermined level.

8. The transmission of claim 5, wherein said at least one predetermined condition is selected from the group consisting essentially of: a step-in throttle condition and a leak-induced pressure loss within the LPAC circuit.

* * * * *